(12) United States Patent
Guo et al.

(10) Patent No.: US 11,579,624 B2
(45) Date of Patent: Feb. 14, 2023

(54) AUTONOMOUS MOBILE APPARATUS AND CONTROL METHOD THEREOF

(71) Applicant: UBTECH ROBOTICS CORP LTD, Shenzhen (CN)

(72) Inventors: Rui Guo, Shenzhen (CN); Chenchen Jiang, Shenzhen (CN); Kun Xie, Shenzhen (CN); Zhichao Liu, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 308 days.

(21) Appl. No.: 16/935,234

(22) Filed: Jul. 22, 2020

(65) Prior Publication Data
US 2021/0191421 A1 Jun. 24, 2021

(30) Foreign Application Priority Data
Dec. 24, 2019 (CN) .......................... 201911350893.1

(51) Int. Cl.
| | |
|---|---|
| G05D 1/00 | (2006.01) |
| G05D 1/02 | (2020.01) |
| G06T 7/579 | (2017.01) |

(52) U.S. Cl.
CPC ......... *G05D 1/0251* (2013.01); *G05D 1/0234* (2013.01); *G05D 1/0242* (2013.01); *G06T 7/579* (2017.01); *G06T 2207/30244* (2013.01)

(58) Field of Classification Search
CPC .. G05D 1/0251; G05D 1/0234; G05D 1/0242; G06T 7/579; G06T 2207/30244

USPC ............................................................ 701/28
See application file for complete search history.

(56) References Cited

U.S. PATENT DOCUMENTS

| | | | | |
|---|---|---|---|---|
| 2019/0329407 | A1* | 10/2019 | Qi .......................... | G05D 1/0234 |
| 2020/0228774 | A1* | 7/2020 | Kar .......................... | G06T 7/579 |
| 2021/0334988 | A1* | 10/2021 | Xiao ....................... | G06K 9/629 |

OTHER PUBLICATIONS

Sooyong Lee and Jae-Bok Song, "Mobile Robot Localization using Infrared Light Reflecting Landmarks," Oct. 17, 2007, International Conference on Control, Automation and Systems 2007, whole document. (Year: 2007).*

* cited by examiner

*Primary Examiner* — Tyler J Lee
*Assistant Examiner* — Tiffany P Ohman (57) ABSTRACT

The present disclosure provides an autonomous mobile apparatus and a control method thereof. The method includes: starting a SLAM mode; obtaining first image data captured by a first camera; extracting a first tag image of positioning tag(s) from the first image data; calculating a three-dimensional camera coordinate of feature points of the positioning tag(s) in a first camera coordinate system of the first camera based on the first tag image; calculating a three-dimensional world coordinate of the feature points of the positioning tag(s) in a world coordinate system based on a first camera pose of the first camera when obtaining the first image data in the world coordinate system and the three-dimensional camera coordinate; and generating a map file based on the three-dimensional world coordinate of the feature points of the positioning tag(s).

20 Claims, 8 Drawing Sheets

AUTONOMOUS MOBILE APPARATUS AND CONTROL METHOD THEREOF

CROSS REFERENCE TO RELATED APPLICATIONS

The present disclosure claims priority to Chinese Patent Application No. 201911350893.1, filed Dec. 24, 2019, which is hereby incorporated by reference herein as if set forth in its entirety.

BACKGROUND

1. Technical Field

The present disclosure relates to autonomous navigation technology, and particularly to an autonomous mobile apparatus and a control method thereof.

2. Description of Related Art

An autonomous mobile apparatus is a new kind of intelligent device. As an intelligent device, it can move autonomously, but before moving, it is necessary to know the plan for the scene where it is located so as to move autonomously. However, here is the disadvantage that the relevant navigation technologies all have the problem of inaccurate navigation. For example, in the scenes such as supermarkets, airports, and computer rooms, since the environment is often highly similar, changing drastically, too empty, and lacking texture, the phenomenon of loss and drift is easy to occur when the autonomous mobile apparatus is navigated and localized in it, which affects the accurate completion of preset tasks or easy to have the risks of falling and collision.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

The technical solutions in the embodiments of the present disclosure will be described clearly and completely in conjunction with the drawings in the embodiments of the present disclosure. It can be understood that, the embodiments described herein are only used for explaining the present disclosure, rather than limiting thereto. In addition, it should be noted that, for ease of description, the drawings only show the parts related to the present disclosure, rather than all components. All other embodiments obtained based on the embodiments of the present disclosure by those skilled in the art without creative efforts are within the scope of the present disclosure.

The "embodiment" referred to in the present disclosure means that, the specific features, structures, or characteristics described in the descriptions of an embodiment can be included in at least one embodiment of the present disclosure. The appearance of the term in various places of the present disclosure does not necessarily refer to the same embodiment, nor necessarily refer to an independent or alternative embodiment mutually exclusive with other embodiments. Those skilled in the art understand explicitly and implicitly that, the embodiment described in the present disclosure can be combined with the other embodiments.

Figure 1:
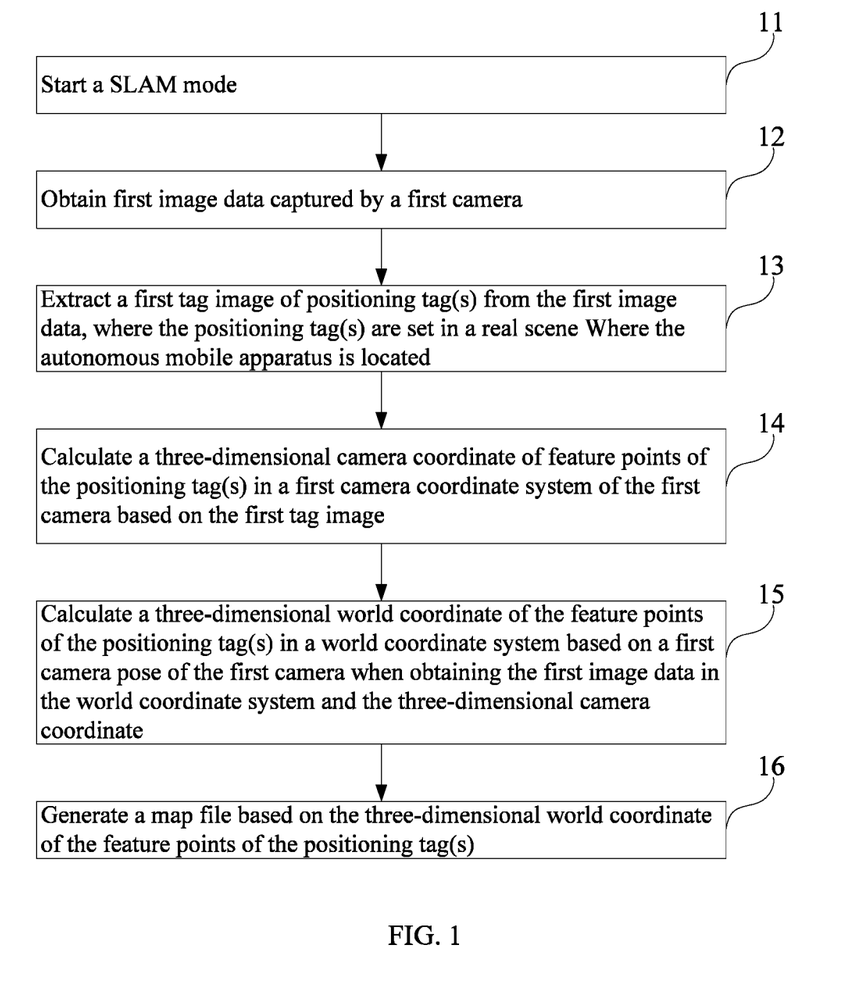
FIG. 1 is a flow chart of a first embodiment of a control method for autonomous mobile apparatus according to the present disclosure.

FIG. 1 is a flow chart of a first embodiment of a control method for autonomous mobile apparatus according to the present disclosure. In this embodiment, a control method for an autonomous mobile apparatus is provided. The autonomous mobile apparatus can be, for example, a robot, a sweeper, a balance car, a driverless car, or an unmanned aerial vehicle. The method is a computer-implemented method executable for a processor. In one embodiment, the method may be implemented through and applied to an autonomous mobile apparatus shown in FIG. 7 or implemented through and applied to a computer readable storage medium shown in FIG. 8. As shown in FIG. 1, the method includes the following steps.

11: starting a SLAM mode.

The SLAM (simultaneous localization and mapping) refers to a mode that the autonomous mobile apparatus starts to move from an unknown location in an unknown environment, localizes itself based on position estimation and map during the movement, and builds incremental maps on the basis of self-localization to realize autonomous localization and navigation of the autonomous mobile apparatus.

12: obtaining first image data captured by a first camera.

In this embodiment, the first image data can be obtained through an image collecting device such as the first camera of the autonomous mobile apparatus. The first camera can be a monocular vision camera, a binocular vision camera, a trinocular vision camera, or other multiocular vision camera. In some embodiments, the image collecting device can be a laser radar or a near infrared (NIR) camera.

13: extracting a first tag image of positioning tag(s) from the first image data, where the positioning tag(s) are set in a real scene where the autonomous mobile apparatus is located.

Figure 2:
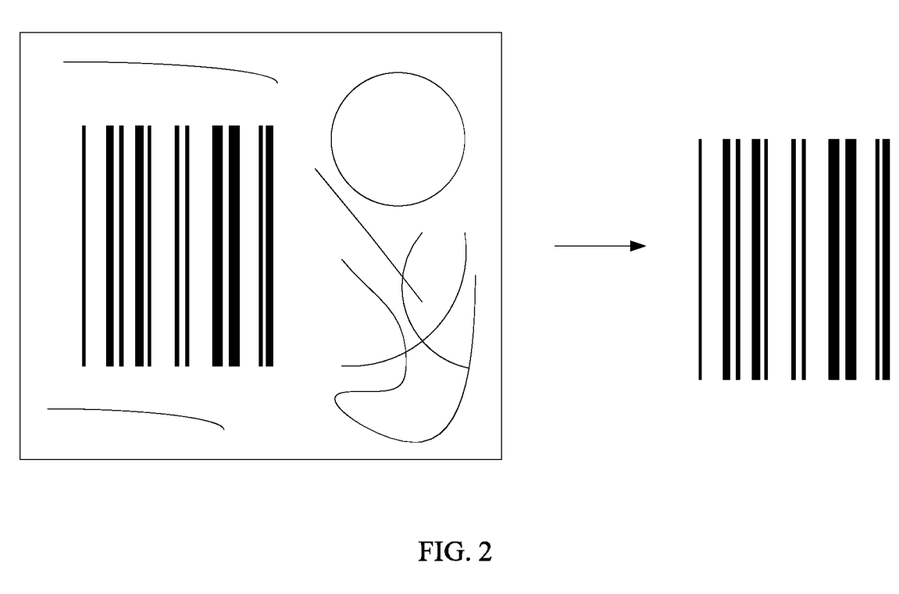
FIG. 2 is a first schematic diagram of extracting positioning tags in the first embodiment of the control method for autonomous mobile apparatus according to the present disclosure.

FIG. 2 is a first schematic diagram of extracting positioning tags in the first embodiment of the control method for autonomous mobile apparatus according to the present disclosure. As shown in FIG. 2, the left part of FIG. 2 shows the obtained first image data, and the right part of FIG. 2 shows the extracted positioning tag image. When the first image on the left part of FIG. 2 is obtained, the autonomous mobile apparatus extracts the first tag image of the positioning tag as show in the right part of FIG. 2 from the first image.

It can be understood that, FIG. 2 is only a schematic, and the positioning tag is not limited to the image shown in FIG. 2.

In one embodiment, the positioning tag can be a one-dimensional code which can be posted in the real scene where the autonomous mobile apparatus is located. For example, in the case that the autonomous mobile apparatus is in an office, the one-dimensional code be posted on the office desks and the office chairs.

In another embodiment, the positioning tag can be a two-dimensional code which can be posted in the real scene where the autonomous mobile apparatus is located. For example, in the case that the autonomous mobile apparatus is in a computer room, the two-dimensional code can be posted on the cabinets and the walls of the computer room.

Figure 3:
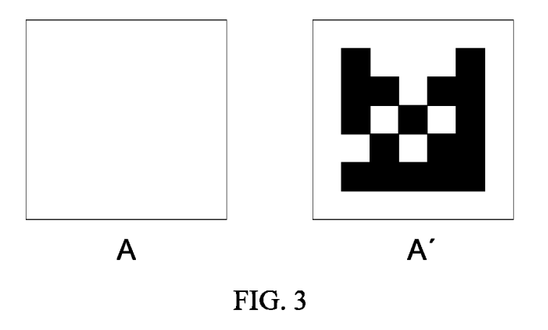
FIG. 3 is a second schematic diagram of extracting positioning tags in the first embodiment of the control method for autonomous mobile apparatus according to the present disclosure.

FIG. 3 is a second schematic diagram of extracting positioning tags in the first embodiment of the control method for autonomous mobile apparatus according to the present disclosure. As shown in FIG. 3, in this embodiment, the positioning tag is a passive infrared two-dimensional code:

As shown in FIG. 3, A and A' are the images of a same two-dimensional code which are displayed in different states, where A is the image of the two-dimensional code in visible light, and A' is the image of the two-dimensional code in infrared light. The two-dimensional code shown in FIG. 3 can be used in the real scene of high-end decoration, elegant layout and strict structure which has fewer tolerances for decoration style differences.

According to a coding rule, after removing the edge, A' includes 5*5 grids where black ones represent 0 and white ones represent 1, and the 5*5 grids follow the following arrangement rules

```
p d p d p
p d p d p
p d p d p;
p d p d p
p d p d p
``` in which, p are check bits (at columns 1, 3 and 5) and d are data bits (at columns 2 and 4), where there are 10 data bits in total, which can represent the number of 0-1023.

A' can be expressed as the following arrangement with numbers 0 and 1:

```
0 1 1 1 0
0 0 1 0 0
0 1 0 1 0;
1 0 1 0 0
0 0 0 0 0
``` after removing the check bits 1, 3 and 5 columns, it can obtain

```
1 1
0 0
```

```
1 1;
0 0
0 0
``` then, each row of the data are connected end to end to obtain: 1100110000, that is, the binary number 1100110000 is obtained to convert to the decimal number 816. In other words, the ID of A' is 816.

It can be understood that, different two-dimensional codes have different IDs, and different coding rules can be adopted.

In one embodiment, if the image of the positioning tag cannot be extracted in the first image data, the first image data will be obtained again to extract the image of the positioning tag.

14: calculating a three-dimensional camera coordinate of feature points of the positioning tag(s) in a first camera coordinate system of the first camera based on the first tag image.

In one embodiment, the feature points of the positioning tag can be obtained by extracting the feature points of the positioning tag through the Harris algorithm, for example, calculating a correlation matrix for each pixel in the first tag image first, then calculating the Harris corner point response of each pixel, and then searching for the maximum value point within a preset range. If the Harris corner point response is greater than a preset threshold, the maximum value point is regarded as a corner point. In which, the corner points is a feature point.

Figure 4:
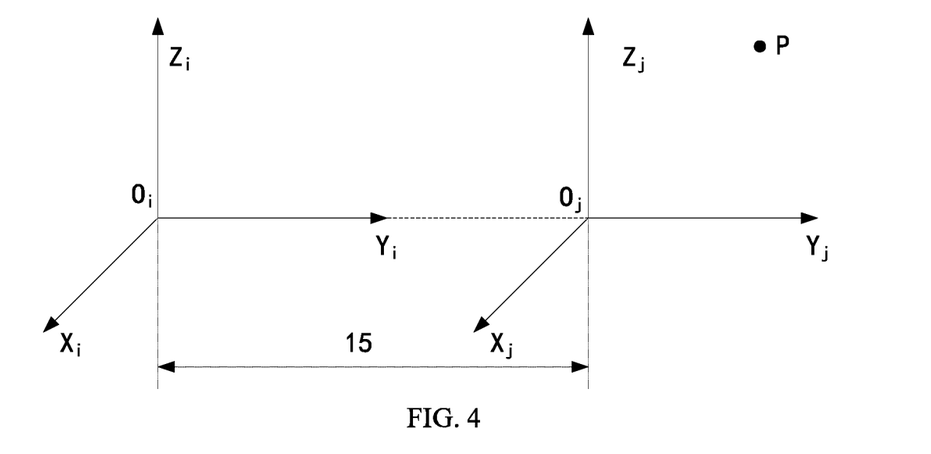
FIG. 4 is a first schematic diagram of converting coordinates in the first embodiment of the control method for autonomous mobile apparatus according to the present disclosure.

After finding out the feature points, the coordinates of the feature points in the first tag image are converted to obtain the three-dimensional camera coordinate(s) of the feature points in the first camera coordinate system of the first camera. FIG. 4 is a first schematic diagram of converting coordinates in the first embodiment of the control method for autonomous mobile apparatus according to the present disclosure. As shown in FIG. 4, in the case that the coordinate of point P in the j coordinate system is $^jP=[-5\ 6\ 6]^T$, the coordinate of point P in the i coordinate system is $^iP=[-5\ 21\ 6]^T$.

In one embodiment, a first relative pose of the positioning tag(s) with respect to the first camera can be calculated based on the first tag image; and a coordinate of the feature points in a tag coordinate system of the positioning tag(s) can be mapped to the first camera coordinate system based on the first relative pose to obtain the three-dimensional camera coordinate.

It can be understood that, different objects have relative reference coordinate systems. In the case that the first camera is taken as the origin of the coordinates, the first relative pose of the positioning tag in the first tag image with respect to the first camera is determined.

In other embodiments, the real scene can also be used as the reference coordinate system so as to calculate the first relative pose of the positioning tag with respect to the world coordinate system.

After obtaining the first relative pose of the positioning tag with respect to the first camera, the coordinate of the feature points of the positioning tag referencing the tag coordinate system of the positioning tag is further mapped to the first camera coordinate system to obtain the relative pose of the feature points with respect to the first camera coordinate system, and then the three-dimensional camera coordinate(s) are obtained based on the relative pose of a plurality of feature points.

15: calculating a three-dimensional world coordinate of the feature points of the positioning tag(s) in a world coordinate system based on a first camera pose of the first camera when obtaining the first image data in the world coordinate system and the three-dimensional camera coordinate.

In which, the first camera pose refers to the position and posture of the first camera in the world coordinate system, where the world coordinate system can use the pose of the autonomous mobile apparatus corresponding to the first frame of the image collected when the mode is started as the initial reference point.

In one embodiment, the three-dimensional world coordinate of the feature points of the positioning tag in the world coordinate system is calculated through the first camera pose and the three-dimensional camera coordinates of the feature points of the positioning tag in the first camera coordinate system of the first camera. As an example, assuming that the three-dimensional camera coordinate of a feature point is $P^c$ and the pose of the autonomous mobile apparatus in the world coordinate system is $T_{wc}$, the coordinate of the feature point in the world coordinate system is $P^w=T_{wc}*P^c$. In which, the three-dimensional world coordinates of the feature points of the positioning tag in the world coordinate system can be calculated through a technical solution similar to the above-mentioned step 14.

It can be understood that, the world coordinate system is a rectangular coordinate system with reference to the earth.

16: generating a map file based on the three-dimensional world coordinate of the feature points of the positioning tag(s).

In some embodiments, before step 16, the method further includes: optimizing the three-dimensional world coordinate of each feature point calculated using the first image data through a constraint relationship between each of the features point in the real scene. Taking the two-dimensional code as an example, it contains four corner points with the coordinates denoted as $C_0$, $C_1$, $C_2$, and $C_3$, respectively, which are arranged clockwise. The constrained relationships mainly include:

a) diagonal vectors $\overrightarrow{C_0C_2}$ and $\overrightarrow{C_1C_3}$ are orthogonal to each other, and their modulus lengths are equal, which is $\sqrt{2}$ times of the side length of the given code;

b) the collinear distance of the diagonal is 0; and c) the dot product of multiplying the difference between the diagonal vectors and the gravity direction is 0.

The three-dimensional world coordinate of each feature point calculated through the first image data are optimized by using the above-mentioned constraint relationships. The map file is then generated using the optimized three-dimensional world coordinate.

In some embodiments, before step 16, the method further includes: weighting and summing the three-dimensional world coordinates corresponding to the feature points of a same positioning tag calculated based on at least two frames of the first image data, if an amount of the first image data corresponding to the same positioning tag is at least two frames.

In one embodiment, the three-dimensional world coordinates of the feature points of the same positioning tag are weighted and summed through the formulas of:

$$P = \sum_{j=1}^{j=N} \frac{w_j}{W} P_j;$$

$$W = \sum_{j=1}^{j=N} w_j; \text{ and}$$

$$w_j = e^{\overline{l_j*sin\theta_j+c_0}} + \frac{1}{j+1};$$

where, N is the amount of the first image data corresponding to the same positioning tag, j is the index of the first image data, $P_j$ is the three-dimensional world coordinate calculated based on the j-th first image data, $w_j$ is the weighting coefficient for the three-dimensional world coordinate $P_j$ corresponding to the j-th first image data, W is the sum of the weighting coefficients, and $l_j$ is the distance between the center of the positioning tag(s) calculated based on the j-th first image data and the center of the first camera, $\theta_j$ is the included angle between the line connecting the center of the positioning tag(s) calculated based on the j-th first image data and the center of the first camera and the center axis of the first camera, and $c_0$ is a preset constant.

In one embodiment, the positioning tag is a two-dimensional code, and the amount of the first image data corresponding to the same positioning tag is at least two frames, that is, the times of the same positioning tag being observed is at least twice, were the different mapping in the three-dimensional world coordinates are also at least twice and denoted as N, and N is greater than or equal to 2. It calculates the weight of the effect of each observation of the two-dimensional code on the mapping result of the three-dimensional world coordinate as $w_j$, where $0<j<=N$, which is to be accumulated to obtain the sum W of all the weights of the observation effects, where $$W = \sum_{j=1}^{j=N} w_j; \text{ and}$$

$$w_j = e^{\overline{l_j*sin\theta_j+c_0}} + \frac{1}{j+1}.$$

The weight effects coefficient of each observation is normalized so that the unique mapping eventually obtained is the weighted sum P of all the above-mentioned mappings. The two-dimensional code contains four corner point with the coordinates denoted as $C_0$, $C_1$, $C_2$, and $C_3$, respectively, which are arranged clockwise, then P is a 4*3 matrix. Then each mapping result is denoted as $P_j$, then $$P = \sum_{j=1}^{j=N} \frac{w_j}{W} P_j.$$

Furthermore, the value of P is optimized and corrected so that all points are coplanar, form a shape with unchanged size, and are perpendicular to the ground. Taking the two-dimensional code as an example, the correction constraints mainly include:

a) diagonal vectors $\overrightarrow{C_0C_2}$ and $\overrightarrow{C_1C_3}$ are orthogonal to each other, and their modulus lengths are equal, which is $\sqrt{2}$ times of the side length of the given code;

b) the collinear distance of the diagonal is 0; and c) the dot product of multiplying the difference between the diagonal vectors and the gravity direction is 0.

In this embodiment, the above-mentioned formula is used to weight and sum the three-dimensional world coordinates, which can effectively generate map files, improve the navigation accuracy of the autonomous mobile apparatus, and improve the navigation and positioning performances of the autonomous mobile apparatus in the environment with the scenes of high similarity, drastic changes, excessive empty, and in lack of textures.

In one embodiment, the weighting coefficient for weighting and summing the three-dimensional world coordinates is set according to the rule of: the greater a distance between a center of the positioning tag(s) calculated based on the first image data and a center of the first camera, the smaller the weighting coefficient for the three-dimensional world coordinates corresponding to the first image data.

In another embodiment, the weighting coefficient for weighting and summing the three-dimensional world coordinates is set according to the rule of: the larger an included angle between a line connecting the center of the positioning tag(s) calculated based on the first image data and the center of the first camera and a center axis of the first camera, the smaller the weighting coefficient for the three-dimensional world coordinates corresponding to the first image data.

In the other embodiment, the weighting coefficient for weighting and summing the three-dimensional world coordinates is set according to the rule of: the later the time of obtaining the first image data, the smaller the weighting coefficient for the three-dimensional world coordinates corresponding to the first image data.

In one embodiment, in the real scene where the autonomous mobile apparatus is located, there can have many positioning tags. Through the calculation in the above-mentioned steps, the three-dimensional world coordinate(s) of the feature points of each positioning tag in the world coordinate system can be obtained. The map file is generated through the three-dimensional world coordinate(s) of the feature points of each positioning tag. After generating the map file, the autonomous mobile apparatus moves autonomously based on the map file.

In some embodiments, the positioning tag is a two-dimensional code. During the generation of the map file, the ID of the two-dimensional code and the three-dimensional world coordinates of the corner points of the two-dimensional code are stored in association so as to generate the map file.

Different from the prior art, the control method for autonomous mobile apparatus of the present disclosure combines the three-dimensional camera coordinate of the feature points of the positioning tag in the camera coordinate system and the camera pose of the camera in the world coordinate system to calculate the three-dimensional world coordinate(s) of the feature points in the world coordinate system so as to effectively generate the map file, which improves the navigation accuracy of the autonomous mobile apparatus and improves the safety factor of the autonomous mobile apparatus.

Figure 5:
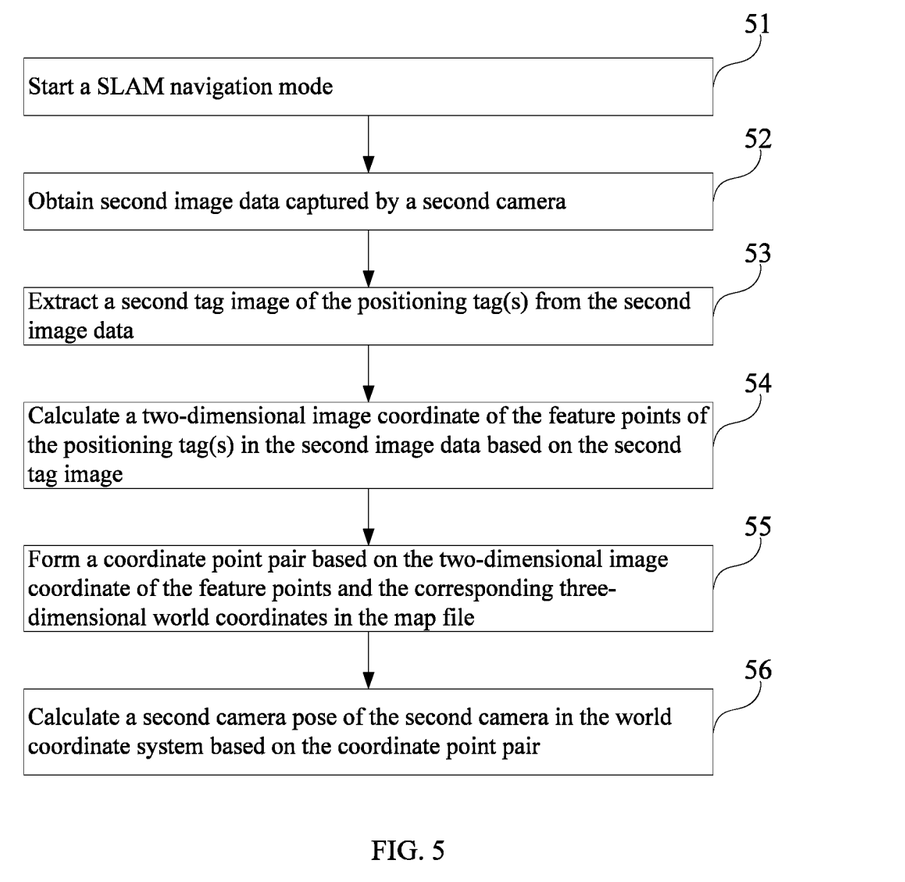
FIG. 5 is a flow chart of a second embodiment of a control method for autonomous mobile apparatus according to the present disclosure.

FIG. 5 is a flow chart of a second embodiment of a control method for autonomous mobile apparatus according to the present disclosure. As shown in FIG. 5, the method includes the following steps.

51: starting a SLAM navigation mode.

In the above-mentioned embodiment, the map file is generated by using the obtained positioning tags in the first image. After the map file is generated, the SLAM navigation mode is activated to assist the autonomous mobile apparatus to move in the real scene.

52: obtaining second image data captured by a second camera.

In this embodiment, the second image data can be obtained through the image collecting device such as the second camera of the autonomous mobile apparatus. During the movement, the second image data is obtained using the camera of the autonomous mobile apparatus. It can be understood that, the camera can obtain a plurality of second image data.

53: extracting a second tag image of the positioning tag(s) from the second image data.

If the second tag image of the positioning tag has not extracted from the second image, the second image data is re-obtained to extract the second tag image of the positioning tag from the second image data.

54: calculating a two-dimensional image coordinate of the feature points of the positioning tag(s) in the second image data based on the second tag image.

55: generating a coordinate point pair based on the two-dimensional image coordinate of the feature points and the corresponding three-dimensional world coordinates in the map file.

56: calculating a second camera pose of the second camera in the world coordinate system based on the coordinate point pair.

Figure 6:
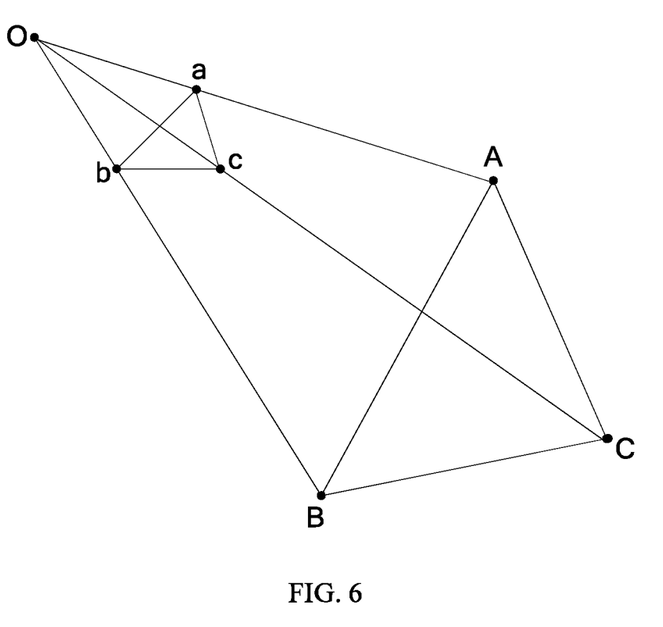
FIG. 6 is a schematic diagram of obtaining second image data in the second embodiment of the control method for autonomous mobile apparatus according to the present disclosure.

FIG. 6 is a schematic diagram of obtaining second image data in the second embodiment of the control method for autonomous mobile apparatus according to the present disclosure. As shown in FIG. 6, the above-mentioned step 56 is briefly described. In which, a monocular vision camera is used to obtain the second image data. If there are three points A, B and C which are the corresponding three-dimensional world coordinates in the map file in the real scene, they are located in the second image after being photographed, which can be understood as projected onto the imaging plane as three points a, b and c. At this time, the coordinates of A, B and C in the world coordinate system are known, but the coordinates of A, B and C in the two-dimensional image coordinate system are unknown. The coordinates of a, b, and c are known in the two-dimensional image coordinate system. It should be noted that, triangle abc and triangle ABC are not necessarily parallel with each other.

According to the theorem of cosine, it can obtain that:

$$OA^2+OB^2-2OA \cdot OB \cdot \cos(a,b)=AB^2;$$

$$OB^2+OC^2-2OB \cdot OC \cdot \cos(b,c)=BC^2; \text{ and}$$

$$OA^2+OC^2-2OA \cdot OC \cdot \cos(a,c)=AC^2;$$

It is assumed that $$x = \frac{OB}{OC}$$

and $$y = \frac{OB}{OC},$$

since the coordinates of A, B and C in the camera coordinate system are unknown, x and y are unknown.

It is further assumed that $$u = \frac{BC^2}{AB^2}$$

and $$w = \frac{AC}{AB},$$

and u and w can be calculated based on the world coordinates of A, B and C.

Two equations can be obtained through a series of transformations:

$$(1-u)y^2 - ux^2 - \cos(b,c)y + 2uxy\cos(a,b) + 1 = 0; \text{ and}$$

$$(1-w)x^2 - wy^2 - \cos(a,c)x + 2wxy\cos(a,b) + 1 = 0.$$

The forgoing equation set is a binary quadratic equation about x and y, which can be solved by the elimination method. It is possible to get up to four solutions, so another set of matching points are required for verification in addition to the three points.

Then, the coordinates of A, B and C in the two-dimensional image coordinate system can be obtained through x and y. According to this principle, the second camera pose of the second camera in the world coordinate system can be obtained.

In some embodiments, if the amount of the second image data corresponding to the same positioning tag is greater than or equal to a threshold, the second camera pose corresponding to each second image data is calculated based on the coordinate point pair generated through each second image data, and the second camera pose is optimized through a minimized re-projection error. In one embodiment, the threshold is not less than 15, where the PnP (perspective-n-point) method is used to estimate a relative pose of the second camera, and then the minimized re-projection error is used to perform a BA (bundle adjustment) optimization to output a relatively accurate relative pose of the second camera.

In some embodiments, if the amount of second image data corresponding to the same positioning tag is smaller than the threshold, the second image data is screened based on a second relative pose of the positioning tag(s) with respect to the second camera calculated based on each second image data, and the second camera pose corresponding to the screened second image data is calculated based on the coordinate point pair generated through the screened second image data.

In one embodiment, it can screen out the second image data within a preset distance range and/or a preset deflection angle range between the positioning tag(s) and the second camera from the second image data based on the second relative pose.

In one embodiment, the threshold is 15, and if it is less than the threshold, it means that it is impossible to obtain enough coordinate point pairs of the feature points of the positioning tag, and the accurate pose estimation is solved through an optimization method. In this case, it needs to remove the two-dimensional code that are too close, too far, and too biased to observe. The screening condition is set to Ti<T0, and the threshold T0 includes two parts of angle and displacement. Taking the autonomous mobile apparatus which is moved on a plane as an example, the direction variable z and the yaw angle θ of the z-axis are limited. As an example, 0.3≤z≤2.5 meters, and −1.04<=θ<=1.04 rad. The amount of the remaining second image data after screening is denoted as M. If M is equal to 0, it returns to obtain the second image data; otherwise, the coordinate point pairs of the feature points of the positioning tag in the second image data are sequentially generated, and the output of the pose of the apparatus or the camera is estimated directly using PnP or DLT (direct linear transform) method.

In some embodiments, the SLAM navigation mode is activated to obtain the second image data, and the second tag image of the positioning tag is extracted from the second image data. If the positioning tag is a two-dimensional code, the ID of the two-dimensional code is obtained, and the corresponding three-dimensional coordinate is searched from the corresponding map file based on ID to assist the positioning and navigation of the autonomous mobile apparatus.

It can be understood that, the second camera in this embodiment and the first camera in the above-mentioned embodiment can be the same camera or different cameras. At the same time, the second camera can be positioned on the autonomous mobile apparatus, or be separated from the autonomous mobile apparatus and transmit the obtained image to the autonomous mobile apparatus through a wireless connection.

In this embodiment, after the map file is built, the coordinate point pair formed by the two-dimensional image coordinates of the feature points of the positioning tag and the corresponding three-dimensional world coordinate in the map file are combined to calculate the second camera pose of the second camera in the world coordinate system to correct or restore the navigation and positioning, which can effectively assist the navigation and positioning of the autonomous mobile apparatus and improve the navigation accuracy of the autonomous mobile apparatus.

Figure 7:
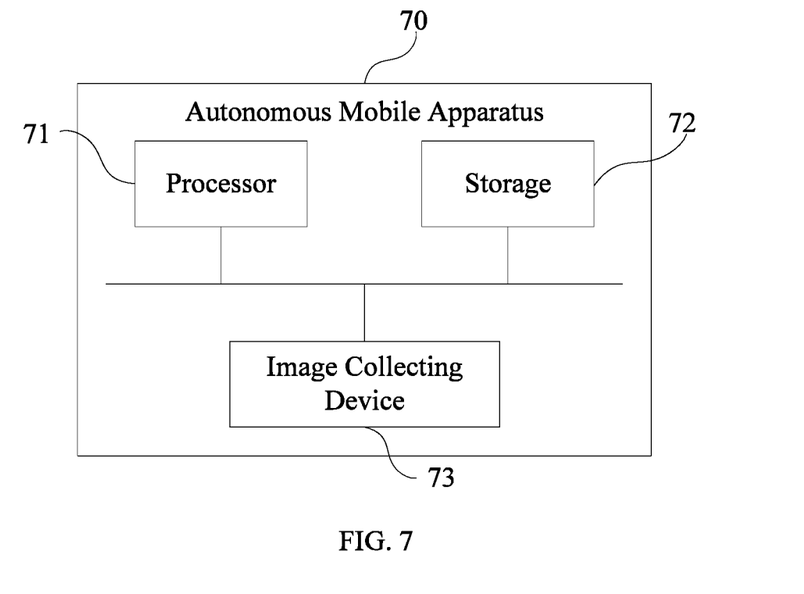
FIG. 7 is a schematic block diagram of an embodiment of an autonomous mobile apparatus according to the present disclosure.

FIG. 7 is a schematic block diagram of an embodiment of an autonomous mobile apparatus according to the present disclosure. In this embodiment, an autonomous mobile apparatus is provided. The autonomous mobile apparatus can be, for example, a robot. As shown in FIG. 7, the autonomous mobile apparatus 70 includes a processor 71 as well as a storage 72 and an image collecting device 73 which are connected to the processor 71. The image collecting device 73 includes a first camera and a second camera.

In which, the image collecting device is used to collect image data, the storage 72 is configured to store program data, and the processor 71 is configured to execute the program data to implement the following method:

starting a SLAM mode; obtaining first image data captured by the first camera; extracting a first tag image of positioning tag(s) from the first image data, where the positioning tag(s) are set in a real scene where the autonomous mobile apparatus is located; calculating a three-dimensional camera coordinate of feature points of the positioning tag(s) in a first camera coordinate system of the first camera based on the first tag image; calculating a three-dimensional world coordinate of the feature points of the positioning tag(s) in a world coordinate system based on a first camera pose of the first camera when obtaining the first image data in the world coordinate system and the three-dimensional camera coordinate; and generating a map file based on the three-dimensional world coordinate of the feature points of the positioning tag(s).

It can be understood that, when the processor 71 is configured to execute the program data, it is also configured to implement any other method in the above-mentioned embodiments.

Figure 8:
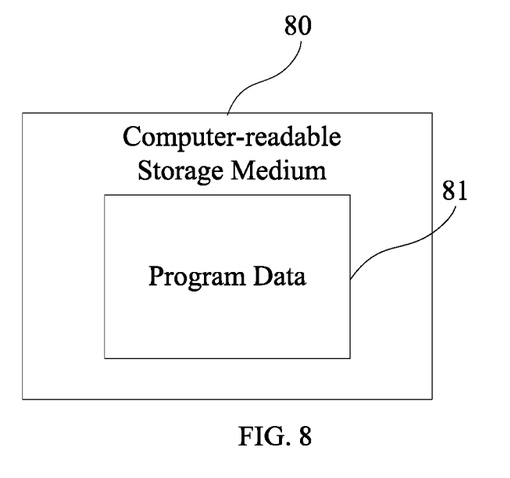
FIG. 8 is a schematic block diagram of an embodiment of a computer readable storage medium according to the present disclosure.

FIG. 8 is a schematic block diagram of an embodiment of a computer readable storage medium according to the present disclosure. In this embodiment, a computer readable storage medium is provided. As shown in FIG. 8, the computer-readable storage medium 80 is configured to store program data 81. When the program data 81 is executed by a processor, it implements the following steps:

starting a SLAM mode; obtaining first image data captured by a first camera; extracting a first tag image of positioning tag(s) from the first image data, where the positioning tag(s) are set in a real scene where the autonomous mobile apparatus is located; calculating a three-dimensional camera coordinate of feature points of the positioning tag(s) in a first camera coordinate system of the first camera based on the first tag image; calculating a three-dimensional world coordinate of the feature points of the positioning tag(s) in a world coordinate system based on a first camera pose of the first camera when obtaining the first image data in the world coordinate system and the three-dimensional camera coordinate; and generating a map file based on the three-dimensional world coordinate of the feature points of the positioning tag(s).

It can be understood that, when the program data 81 is executed by the processor, any other method in the above-mentioned embodiments can be implemented.

In the embodiments provided by the present disclosure, it is to be understood that the disclosed methods and devices can be implemented in other ways. For example, the device embodiments described above are merely illustrative; the division of the modules or units is merely a division of logical functions, and can be divided in other ways such as combining or integrating multiple units or components with another system when being implemented; and some features can be ignored or not executed.

The units described as separated components can or cannot be physically separate, and the components shown as units can or cannot be physical units, that is, can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a non-transitory computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented control method for an autonomous mobile apparatus, comprising:

providing the autonomous mobile apparatus comprising a processor, a first camera, and a second camera, wherein the first camera and the second camera are electrically coupled to the processor;

starting, by the processor, a SLAM mode;

obtaining, by the first camera, first image data;

extracting, by the processor, a first tag image of one or more positioning tags from the first image data, wherein the one or more positioning tags are set in a real scene the autonomous mobile apparatus being located;

calculating, by the processor, a three-dimensional camera coordinate of feature points of the one or more positioning tags in a first camera coordinate system of the first camera based on the first tag image;

calculating, by the processor, a three-dimensional world coordinate of the feature points of the one or more positioning tags in a world coordinate system based on a first camera pose of the first camera when obtaining the first image data in the world coordinate system and the three-dimensional camera coordinate;

generating, by the processor, a map file based on the three-dimensional world coordinate of the feature points of the one or more positioning tags;

controlling, by the processor, the autonomous mobile apparatus to move based on the map file, and starting a SLAM navigation mode to assist the autonomous mobile apparatus to move;

obtaining, by the second camera, second image data;

extracting, by the processor, a second tag image of the one or more positioning tags from the second image data;

calculating, by the processor, a two-dimensional image coordinate of the feature points of the one or more positioning tags in the second image data based on the second tag image;

generating, by the processor, a coordinate point pair based on the two-dimensional image coordinate of the feature points and the corresponding three-dimensional world coordinates in the map file; and calculating, by the processor, a second camera pose of the second camera in the world coordinate system based on the coordinate point pair.

2. The method of claim 1, wherein the step of calculating, by the processor, the three-dimensional camera coordinate of the feature points of the one or more positioning tags in the first camera coordinate system of the first camera based on the first tag image comprises:

calculating, by the processor, a first relative pose of the one or more positioning tags with respect to the first camera based on the first tag image; and mapping, by the processor, a coordinate of the feature points in a tag coordinate system of the one or more positioning tags to the first camera coordinate system based on the first relative pose to obtain the three-dimensional camera coordinate.

3. The method of claim 1, wherein before the step of generating, by the processor, the map file based on the three-dimensional world coordinate of the feature points of the one or more positioning tags, the method further comprises steps of:
weighting and summing, by the processor, the three-dimensional world coordinates corresponding to the feature points of a same positioning tag calculated based on at least two frames of the first image data, in response to an amount of the first image data corresponding to the same positioning tag being at least two frames.

4. The method of claim 3, wherein a weighting coefficient for weighting and summing the three-dimensional world coordinates is determined according to at least one of:
the greater a distance between a center of the one or more positioning tags calculated based on the first image data and a center of the first camera, the smaller the weighting coefficient for the three-dimensional world coordinates corresponding to the first image data;
the larger an included angle between a line connecting the center of the one or more positioning tags calculated based on the first image data and the center of the first camera and a center axis of the first camera, the smaller the weighting coefficient for the three-dimensional world coordinates corresponding to the first image data; and
the later the time of obtaining the first image data, the smaller the weighting coefficient for the three-dimensional world coordinates corresponding to the first image data.

5. The method of claim 3, wherein the step of weighting and summing, by the processor, the three-dimensional world coordinates corresponding to the feature points of the same positioning tag calculated based on at least two frames of the first image data comprises:
weighting and summing, by the processor, the three-dimensional world coordinates of the feature points of the same positioning tag through the formulas of:

$$P = \sum_{j=1}^{j=N} \frac{w_j}{W} P_j;$$

$$W = \sum_{j=1}^{j=N} w_j; \text{ and}$$

$$w_j = e^{\frac{1}{l_j * \sin\theta_j + c_0}} + \frac{1}{j+1};$$

where, N is the amount of the first image data corresponding to the same positioning tag, j is the index of the first image data, $P_j$ is the three-dimensional world coordinate calculated based on the j-th first image data, $w_j$ is the weighting coefficient for the three-dimensional world coordinate $P_j$ corresponding to the j-th first image data, and $l_j$ is the distance between the center of the one or more positioning tags calculated based on the j-th first image data and the center of the first camera, $\theta_j$ is the included angle between the line connecting the center of the one or more positioning tags calculated based on the j-th first image data and the center of the first camera and the center axis of the first camera, and $c_0$ is a preset constant.

6. The method of claim 1, wherein before the step of generating, by the processor, the map file based on the three-dimensional world coordinate of the feature points of the one or more positioning tags, the method further comprises steps of:
optimizing, by the processor, the three-dimensional world coordinate of each feature point calculated using the first image data through a constraint relationship between each of the features point in the real scene.

7. The method of claim 1, wherein the step of calculating, by the processor, the second camera pose of the second camera in the world coordinate system based on the coordinate point pair comprises:
calculating, by the processor, the second camera pose corresponding to each second image data based on the coordinate point pair generated through each second image data and optimizing the second camera pose through a minimized re-projection error, in response to an amount of second image data corresponding to the same positioning tag being greater than or equal to a threshold; and
screening, by the processor, the second image data based on a second relative pose of the one or more positioning tags with respect to the second camera calculated based on each second image data and calculating the second camera pose corresponding to the screened second image data based on the coordinate point pair generated through the screened second image data, in response to the amount of second image data corresponding to the same positioning tag being smaller than the threshold.

8. The method of claim 7, wherein the step of screening, by the processor, the second image data based on the second relative pose of the one or more positioning tags with respect to the second camera calculated based on each second image data and calculating the second camera pose corresponding to the screened second image data based on the coordinate point pair generated by the screened second image data comprises:
screening, by the processor, out the second image data within a preset distance range and/or a preset deflection angle range between the one or more positioning tags and the second camera from the second image data based on the second relative pose.

9. The method of claim 1, wherein each of the one or more positioning tags is a two-dimensional code, each feature point is a corner point of the two-dimensional code, and the one or more positioning tags are not visible in visible light and are visible in infrared light.

10. The method of claim 9, wherein different two-dimensional codes have different IDs, and are generated by different coding rules.

11. The method of claim 1, further comprising:
using, by the processor, the second camera pose of the second camera in the world coordinate system to correct or restore navigation and positioning of the autonomous mobile apparatus.

12. An autonomous mobile apparatus, comprising:
a processor;
a non-transitory memory coupled to the processor;
an image collecting device coupled to the processor; and
one or more computer programs stored in the non-transitory memory and executable on the processor;
wherein, the image collecting device is configured to collect image data and comprises a first camera and a second camera, and the one or more computer programs comprise:

instructions for starting a SLAM mode;
instructions for obtaining first image data by the first camera;
instructions for extracting a first tag image of one or more positioning tags from the first image data, wherein the one or more positioning tags are set in a real scene the autonomous mobile apparatus being located;
instructions for calculating a three-dimensional camera coordinate of feature points of the one or more positioning tags in a first camera coordinate system of the first camera based on the first tag image;
instructions for calculating a three-dimensional world coordinate of the feature points of the one or more positioning tags in a world coordinate system based on a first camera pose of the first camera when obtaining the first image data in the world coordinate system and the three-dimensional camera coordinate;
instructions for generating a map file based on the three-dimensional world coordinate of the feature points of the one or more positioning tags;
instructions for controlling the autonomous mobile apparatus to move based on the map file, and starting a SLAM navigation mode to assist the autonomous mobile apparatus to move;
instructions for obtaining second image data by the second camera;
instructions for extracting a second tag image of the one or more positioning tags from the second image data;
instructions for calculating a two-dimensional image coordinate of the feature points of the one or more positioning tags in the second image data based on the second tag image;
instructions for generating a coordinate point pair based on the two-dimensional image coordinate of the feature points and the corresponding three-dimensional world coordinates in the map file; and
instructions for calculating a second camera pose of the second camera in the world coordinate system based on the coordinate point pair.

13. The apparatus of claim 12, wherein the instructions for calculating the three-dimensional camera coordinate of the feature points of the one or more positioning tags in the first camera coordinate system of the first camera based on the first tag image comprise:
instructions for calculating a first relative pose of the one or more positioning tags with respect to the first camera based on the first tag image; and
instructions for mapping a coordinate of the feature points in a tag coordinate system of the one or more positioning tags to the first camera coordinate system based on the first relative pose to obtain the three-dimensional camera coordinate.

14. The apparatus of claim 12, wherein the one or more computer programs further comprise:
instructions for weighting and summing the three-dimensional world coordinates corresponding to the feature points of a same positioning tag calculated based on at least two frames of the first image data, in response to an amount of the first image data corresponding to the same positioning tag being at least two frames.

15. The apparatus of claim 14, wherein a weighting coefficient for weighting and summing the three-dimensional world coordinates is determined according to at least one of:
the greater a distance between a center of the one or more positioning tags calculated based on the first image data and a center of the first camera, the smaller the weighting coefficient for the three-dimensional world coordinates corresponding to the first image data;
the larger an included angle between a line connecting the center of the one or more positioning tags calculated based on the first image data and the center of the first camera and a center axis of the first camera, the smaller the weighting coefficient for the three-dimensional world coordinates corresponding to the first image data; and
the later the time of obtaining the first image data, the smaller the weighting coefficient for the three-dimensional world coordinates corresponding to the first image data.

16. The apparatus of claim 14, wherein the instructions for weighting and summing the three-dimensional world coordinates corresponding to the feature points of the same positioning tag calculated based on at least two frames of the first image data comprise:
instructions for weighting and summing the three-dimensional world coordinates of the feature points of the same positioning tag through the formulas of:

$$P = \sum_{j=1}^{j=N} \frac{w_j}{W} P_j;$$

$$W = \sum_{j=1}^{j=N} w_j; \text{ and}$$

$$w_j = e^{\frac{1}{l_j * \sin\theta_j + c_0}} + \frac{1}{j+1};$$

where, N is the amount of the first image data corresponding to the same positioning tag, j is the index of the first image data, $P_j$ is the three-dimensional world coordinate calculated based on the j-th first image data, $w_j$ is the weighting coefficient for the three-dimensional world coordinate $P_j$ corresponding to the j-th first image data, and $l_j$ is the distance between the center of the one or more positioning tags calculated based on the j-th first image data and the center of the first camera, $\theta_j$ is the included angle between the line connecting the center of the one or more positioning tags calculated based on the j-th first image data and the center of the first camera and the center axis of the first camera, and $c_0$ is a preset constant.

17. The apparatus of claim 12, wherein the one or more computer programs further comprise:
instructions for optimizing the three-dimensional world coordinate of each feature point calculated using the first image data through a constraint relationship between each of the features point in the real scene.

18. The apparatus of claim 12, wherein the instructions for calculating the second camera pose of the second camera in the world coordinate system based on the coordinate point pair comprise:
instructions for calculating the second camera pose corresponding to each second image data based on the coordinate point pair generated through each second image data and optimizing the second camera pose through a minimized re-projection error, in response to an amount of second image data corresponding to the same positioning tag being greater than or equal to a threshold; and
instructions for screening the second image data based on a second relative pose of the one or more positioning tags with respect to the second camera calculated based on each second image data and calculating the second camera pose corresponding to the screened second image data based on the coordinate point pair generated through the screened second image data, in response to the amount of second image data corresponding to the same positioning tag being smaller than the threshold.

19. The apparatus of claim 18, wherein the instructions for screening the second image data based on the second relative pose of the one or more positioning tags with respect to the second camera calculated based on each second image data and calculating the second camera pose corresponding to the screened second image data based on the coordinate point pair generated by the screened second image data comprise:

instructions for screening out the second image data within a preset distance range and/or a preset deflection angle range between the one or more positioning tags and the second camera from the second image data based on the second relative pose.

20. The apparatus of claim 12, wherein each of the one or more positioning tags is a two-dimensional code, each feature point is a corner point of the two-dimensional code, and the one or more positioning tags are not visible in visible light and are visible in infrared light.

\* \* \* \* \*